(12) United States Patent
Burke et al.

(10) Patent No.: US 11,815,424 B2
(45) Date of Patent: Nov. 14, 2023

(54) BACKFLOW PREVENTION SYSTEM TEST COCK WITH A FLUID SENSOR

(71) Applicant: Watts Regulator Co., North Andover, MA (US)

(72) Inventors: Joseph Michael Burke, Deerfield, NH (US); Muhannad Bagegni, North Andover, MA (US); Jason Doughty, Fitchburg, MA (US); Frank DiBenedetto, North Andover, MA (US); Ian David Baynes, Merrimac, MA (US)

(73) Assignee: Watts Regulator Co., North Andover, MA (US)

( * ) Notice: Subject to any disclaimer, the term of this patent is extended or adjusted under 35 U.S.C. 154(b) by 440 days.

(21) Appl. No.: 16/870,000

(22) Filed: May 8, 2020

(65) Prior Publication Data

US 2020/0355576 A1    Nov. 12, 2020

Related U.S. Application Data

(60) Provisional application No. 62/869,195, filed on Jul. 1, 2019, provisional application No. 62/844,912, filed on May 8, 2019.

(51) Int. Cl.
*G01M 13/003* (2019.01)
*F16K 37/00* (2006.01)
*E03B 7/07* (2006.01)

(52) U.S. Cl.
CPC .......... *G01M 13/003* (2019.01); *E03B 7/077* (2013.01); *F16K 37/0091* (2013.01)

(58) Field of Classification Search
CPC .. G01M 13/003; E03B 7/077; F16K 37/0091; F16K 15/03
See application file for complete search history.

(56) References Cited

U.S. PATENT DOCUMENTS

| 213,394 A | 3/1879 | Cornwal |
| 623,418 A | 4/1899 | O'Meara |

(Continued)

FOREIGN PATENT DOCUMENTS

| CN | 110081212 A | 8/2019 |
| DE | 1925477 A1 | 12/1970 |

(Continued)

OTHER PUBLICATIONS

Lead Free Master Series LF870V product specifications pages, ES-F-LF-870V 1826, 2018, 4 pages.

(Continued)

*Primary Examiner* — Jessica Cahill
(74) *Attorney, Agent, or Firm* — Day Pitney LLP; George N. Chaclas

(57) ABSTRACT

A test cock for determining an operating condition of a backflow prevention system includes a body portion having a distal end and a proximal end and a space defined within the body portion. A distal opening is provided on the body portion at the distal end and a proximal opening is provided on the body portion at the proximal end and the proximal opening is in fluid connection with the body portion space. A body portion fitting is disposed in the body portion and is providing a fluid connection with the body portion space. A fluid sensor is coupled to the body portion fitting and is in fluid connection with the body portion space. A rotating system fitting has a first end and a second end where the second end is provided in the body portion proximal opening.

17 Claims, 11 Drawing Sheets

(56) References Cited

U.S. PATENT DOCUMENTS

| | | | |
|---|---|---|---|
| 953,940 A | 4/1910 | Beam | |
| 2,310,586 A | 2/1943 | Lohman | |
| 2,514,374 A | 7/1950 | Cooper | |
| 2,827,921 A | 3/1958 | Sherman et al. | |
| 3,173,439 A | 3/1965 | Griswold et al. | |
| 3,189,037 A | 6/1965 | Modesto | |
| 3,429,291 A | 2/1969 | Hoffman | |
| 3,570,537 A | 3/1971 | Kelly | |
| 3,817,278 A | 6/1974 | Elliott | |
| 3,837,357 A | 9/1974 | Slaughter | |
| 3,837,358 A | 9/1974 | Zieg et al. | |
| 3,859,619 A | 1/1975 | Ishihara et al. | |
| 3,896,850 A | 7/1975 | Waltrip | |
| 3,905,382 A | 9/1975 | Waterston | |
| 3,906,987 A | 9/1975 | Rushforth et al. | |
| 3,996,962 A | 12/1976 | Sutherland | |
| 4,014,284 A | 3/1977 | Read | |
| 4,244,392 A | 1/1981 | Griswold | |
| 4,284,097 A * | 8/1981 | Becker | E03C 1/108 |
| | | | 137/454.2 |
| 4,416,211 A | 11/1983 | Hoffman | |
| 4,453,561 A | 6/1984 | Sands | |
| 4,489,746 A | 12/1984 | Daghe et al. | |
| 4,523,476 A | 6/1985 | Larner | |
| 4,618,824 A | 10/1986 | Magee et al. | |
| 4,667,697 A | 5/1987 | Crawford | |
| 4,694,859 A * | 9/1987 | Smith, III | F16L 37/30 |
| | | | 285/11 |
| 4,776,365 A | 10/1988 | Bathrick et al. | |
| 4,777,979 A | 10/1988 | Twerdochlib | |
| 4,920,802 A | 5/1990 | McMullin et al. | |
| 4,945,940 A | 8/1990 | Stevens | |
| 5,008,841 A | 4/1991 | McElroy | |
| 5,024,469 A * | 6/1991 | Aitken | F16L 27/12 |
| | | | 285/302 |
| 5,072,753 A | 12/1991 | Ackroyd | |
| 5,125,429 A | 6/1992 | Ackroyd et al. | |
| 5,236,009 A | 8/1993 | Ackroyd | |
| 5,299,718 A | 4/1994 | Shwery | |
| 5,404,905 A | 4/1995 | Lauria | |
| 5,425,393 A * | 6/1995 | Everett | E03C 1/106 |
| | | | 137/107 |
| 5,452,974 A | 9/1995 | Binns | |
| 5,520,367 A | 5/1996 | Stowers | |
| 5,551,473 A | 9/1996 | Lin et al. | |
| 5,566,704 A * | 10/1996 | Ackroyd | E03C 1/106 |
| | | | 137/557 |
| 5,584,315 A | 12/1996 | Powell | |
| 5,586,571 A | 12/1996 | Guillermo | |
| 5,669,405 A | 9/1997 | Engelmann | |
| 5,711,341 A | 1/1998 | Funderburk et al. | |
| 5,713,240 A | 2/1998 | Engelmann | |
| 5,901,735 A | 5/1999 | Breda | |
| 5,918,623 A | 7/1999 | Hidessen | |
| 5,947,152 A | 9/1999 | Martin et al. | |
| 5,992,441 A | 11/1999 | Enge et al. | |
| 6,021,805 A | 2/2000 | Horne et al. | |
| 6,123,095 A | 9/2000 | Kersten et al. | |
| 6,155,291 A | 12/2000 | Powell | |
| 6,170,510 B1 | 1/2001 | King et al. | |
| 6,343,618 B1 | 2/2002 | Britt et al. | |
| 6,349,736 B1 | 2/2002 | Dunmire | |
| 6,374,849 B1 | 4/2002 | Howell | |
| 6,378,550 B1 | 4/2002 | Herndon et al. | |
| 6,443,184 B1 | 9/2002 | Funderburk | |
| 6,471,249 B1 | 10/2002 | Lewis | |
| 6,513,543 B1 | 2/2003 | Noll et al. | |
| 6,546,946 B2 | 4/2003 | Dunmire | |
| 6,581,626 B2 | 6/2003 | Noll et al. | |
| 6,659,126 B2 | 12/2003 | Dunmire et al. | |
| 6,675,110 B2 * | 1/2004 | Engelmann | F16K 37/0091 |
| | | | 702/45 |
| 7,051,763 B2 | 5/2006 | Heren | |
| 7,114,418 B1 | 10/2006 | Allen | |
| 7,434,593 B2 | 10/2008 | Noll et al. | |
| 7,506,395 B2 * | 3/2009 | Eldridge | E03B 7/006 |
| | | | 15/104.03 |
| 7,784,483 B2 | 8/2010 | Grable et al. | |
| 7,934,515 B1 | 5/2011 | Towsley et al. | |
| 8,220,839 B2 | 7/2012 | Hall | |
| 8,997,772 B2 | 4/2015 | Noll et al. | |
| 9,091,360 B2 | 7/2015 | Frahm | |
| 9,546,475 B2 | 1/2017 | Lu | |
| 9,899,819 B1 | 2/2018 | Holloway | |
| 9,995,605 B2 | 6/2018 | Konno et al. | |
| 10,132,425 B2 | 11/2018 | Di Monte | |
| 10,561,874 B2 | 2/2020 | Williams et al. | |
| 10,719,904 B2 | 7/2020 | Yasumuro et al. | |
| 10,883,893 B2 | 1/2021 | Shaw et al. | |
| 10,914,412 B2 | 2/2021 | Doughty et al. | |
| 10,962,143 B2 | 3/2021 | Cis et al. | |
| 11,137,082 B2 | 10/2021 | Okuno et al. | |
| 2002/0043282 A1* | 4/2002 | Horne | E03C 1/108 |
| | | | 137/218 |
| 2002/0078801 A1 | 6/2002 | Persechino | |
| 2003/0000577 A1 | 1/2003 | Noll et al. | |
| 2003/0168105 A1 | 9/2003 | Funderburk | |
| 2004/0045604 A1 | 3/2004 | Dunmire et al. | |
| 2004/0107993 A1 | 6/2004 | Stephens | |
| 2005/0092364 A1 | 5/2005 | Furuya et al. | |
| 2005/0199291 A1 | 9/2005 | Price et al. | |
| 2006/0076062 A1 | 4/2006 | Andersson | |
| 2006/0196542 A1 | 9/2006 | Yen | |
| 2007/0181191 A1 | 8/2007 | Wittig et al. | |
| 2007/0193633 A1 | 8/2007 | Howell et al. | |
| 2007/0204916 A1* | 9/2007 | Clayton | F16K 17/02 |
| | | | 137/512 |
| 2007/0204917 A1 | 9/2007 | Clayton et al. | |
| 2007/0240765 A1 | 10/2007 | Katzman et al. | |
| 2008/0145739 A1 | 6/2008 | Adams et al. | |
| 2008/0289567 A1 | 11/2008 | Gordon | |
| 2009/0136935 A1 | 5/2009 | Petersen | |
| 2009/0194719 A1 | 8/2009 | Mulligan | |
| 2011/0067225 A1 | 3/2011 | Bassaco | |
| 2011/0309076 A1 | 12/2011 | Liebenberg et al. | |
| 2012/0248759 A1* | 10/2012 | Feith | B25B 27/10 |
| | | | 137/15.01 |
| 2013/0026743 A1* | 1/2013 | Baca | F16L 27/093 |
| | | | 137/15.01 |
| 2013/0255452 A1 | 10/2013 | Kovach | |
| 2014/0109986 A1 | 4/2014 | Cordes | |
| 2017/0023141 A1 | 1/2017 | Andersson | |
| 2018/0156488 A1* | 6/2018 | Evans | F16K 15/1821 |
| 2019/0043157 A1 | 2/2019 | Yasumuro et al. | |
| 2019/0136935 A1 | 5/2019 | Hulstein et al. | |
| 2019/0162341 A1 | 5/2019 | Chiproot | |
| 2019/0271428 A1 | 9/2019 | O'Connor et al. | |
| 2019/0323618 A1* | 10/2019 | Fletcher | F16K 25/00 |
| 2020/0141612 A1 | 5/2020 | Thibodeaux | |
| 2020/0370677 A1 | 11/2020 | Mendez | |
| 2021/0172157 A1 | 6/2021 | Burke et al. | |
| 2021/0230850 A1 | 7/2021 | Bouchard et al. | |
| 2021/0332898 A1 | 10/2021 | Cellemme | |

FOREIGN PATENT DOCUMENTS

| | | | | |
|---|---|---|---|---|
| DE | 8525261 U1 | 11/1985 | | |
| DE | 202014102568 U1 | 9/2015 | | |
| EP | 1521004 A1 | 4/2005 | | |
| EP | 3434833 A1 * | 1/2019 | | E03B 7/077 |
| EP | 3832183 A1 * | 6/2021 | | F16K 37/0083 |
| FR | 2928750 A1 | 9/2009 | | |
| GB | 1231579 | 11/1967 | | |
| JP | 2002213629 A | 7/2002 | | |
| WO | 2003060459 A1 | 7/2003 | | |
| WO | 2020023584 A1 | 1/2020 | | |

OTHER PUBLICATIONS

Watt TK-99E Backflow Preventer Test Kit Product Specifications and Test Information, IS-TK99E 0829, 2009, 4 pages.

(56) References Cited

OTHER PUBLICATIONS

Watts Water Technologies Company, Installation, Maintenance & Repair Series 909, LF909, 909RPDA, LF909RPDA, 2016, 8 pages.
Watts Water Company, Series 909RPDA for Health Hazard Applications, 2016, 4 pages.
Watts Regulator Co., WATTS ACV 113-6RFP Flood Protection Shutdown Valve for Health Hazard Applications, 2020, 4 pages.
European Search Report for European Patent Application No. 20192133.5 dated Feb. 1, 2021 , 9 pages.
Ames Fire & Waterworks, division of Watts Industries, F-A-Spools/Flanges, 2001, 4 pages.
Watts, S-RetroFit-Simple, 2017, 2 pages.
*Zurn Industries, LLC* vs. *Conbraco Industries, Inc.*, Complaint for patent infringement, United States District Court for the Center District of California Western Division, Case No. 2.16-CV-5656, Jul. 29, 2016; 5 pages.
Wilkins Company, Model 375/475MS Series, Installation, Maintenance and Instruction Sheet, 2006, 1 page.
Apollo Valves PVB4A Series Installation, Operation and Maintenance Manual for Model PVB4A 1/2"-2" Pressure Vacuum Breaker Backflow Preventer, dated Jan. 11, 2012, 12 pages.
Apollo Valves PVB4A Series Installation, Operation, and Maintenance Manual, copyright May 2009, 9 pages.
Watts Water Technologies Company Brochure ES LF800M4QT for Health Hazard Applications Lead Free Series LF8 M4QT Anti-Siphon Vacuum Breakers Sizes 1/2"-2", copyright 2013, 4 pages.
Conbraco BFMMPVB Maintenance Manual for Series 4V-500 1/2"-2" Pressure Type Vacuum Breaker, Apr. 2002, Conbraco Industries, Inc., Matthews, North Carolina 28106, 6 pages.
Watts, "Double Check Valve Assembly Backflow Preventers, Bronze," Article 1, 2021, 6 pages.
Watts, "Reduced Pressure Zone Assembly Backflow Preventers, Bronze Body, Sizes 1/4-2 IN," Article 1, 2021, 16 pages.
Miscellaneous Communication issued in European patent application No. 20211811.3, dated Apr. 5, 2021, 8 pages.
Office Action issued in corresponding Chinese patent application No. 20201920527.3, dated Mar. 10, 2021, 1 page (translation unavailable).
International Search Report and Written Opinion issued in corresponding international patent application No. PCT/US2021/046208, dated Dec. 1, 2021, 8 pages.
International Search Report and Written Opinion issued in corresponding International Patent Application No. PCT/US2021/062395, dated Feb. 23, 2022,7 pages.
International Search Report and Written Opinion issued in corresponding International Patent Application No. PCT/US2021/046101, dated Nov. 22, 2021, 8 pages.
Extended European Search Report received for European Patent Application No. 20211811.3. dated May 4, 2021, 2 pages.
Zurn Wilkins 300AR Series, Backflow Preventor Order Form No. 480-060, Apr. 2017, 2 pages.
Apollo Valves, Apollo backflow preventer in-line "R" retrofit series, dated Jul. 29, 2016, 2 pages.
Wilkins Model 420 XL Lead-Free pressure Vacuum Breakers 1/2", 3/4", and 1" (date unknown), 2 pages.

\* cited by examiner

_US 11,815,424 B2_

BACKFLOW PREVENTION SYSTEM TEST COCK WITH A FLUID SENSOR

RELATED APPLICATION

This application claims priority from U.S. Provisional Patent Application Ser. No. 62/844,912 entitled "Backflow Prevention System Test Cock With A Fluid Sensor," filed May 8, 2019, and from U.S. Provisional Patent Application Ser. No. 62/869,195 entitled "Wireless Communication System Within A Mechanical Room," filed Jul. 1, 2019, the entire contents of each of which is incorporated by reference in its entirety for all purposes.

FIELD OF THE DISCLOSURE

The subject disclosure relates to backflow prevention valves and assemblies, and more particularly to a device for continuously monitoring the status of the backflow prevention system.

BACKGROUND

In many water systems, a backflow prevention valve and assembly, sometimes referred to as a backflow preventer (BFP), assures that a fluid, and any solids therein, flows in only a desired direction, i.e., a forward direction. As back-siphonage, or backflow, may cause contamination and health problems, a BFP prevents flow in an undesired direction, i.e., a backward or reverse direction. For example, backflow prevention valves and assemblies are installed in buildings, such as residential homes, and commercial buildings and factories, to protect public water supplies by preventing the reverse flow of contaminated water back into the public water supply.

Referring now to FIG. 1, a typical backflow preventer (BFP) 100 includes an inlet shutoff valve 105 and an outlet shutoff valve 110 with a backflow prevention valve 115 positioned between the inlet and outlet shutoff valves where the forward flow direction F is shown. It is noted that many different configurations of backflow prevention assemblies are commercially available, each being different in configuration, and the BFP 100 presented here is merely an example.

Owing to the fact that backflow preventers (BFPs) are important for water safety, they are manually tested on an annual basis to assure proper operating condition. Specifically, fluid pressure measurements are taken at specified locations in the BFP 100. To facilitate these pressure measurements, the BFP 100 includes a number of Test Cocks (TCs) 102a-102d (generally 102), each of which includes a ball valve, where the TC 102 is threadably connected to couple with a fluid path within the BFP 100 via a corresponding TC port 125a-125d (generally 125) on the BFP 100.

There are, in the most common implementation, four TCs 102 located on the BFP 100 in order to allow for temporarily attaching measuring equipment to measure the flow to ensure that the BFP 100 is functioning correctly.

Accordingly, a first TC 102-1 measures the pressure coming into the BFP 100; a second TC 102-2 measures the pressure just before a first check valve (not shown); a third TC 102-3 measures the pressure right after the first check valve; and a fourth TC 102-4 measures the pressure right after a second check valve (not shown).

Again, because of the public safety importance of the BFP, it is often a certified BFP Technician that conducts the testing to confirm that the BFP is in compliance with national standards bodies' requirements.

It is known to use an Electronic Pressure Sensor (EPS) to measure the fluid pressure at different points within the BFP. As such, a common approach to implementing an EPS redirects flow from a TC port 125-x to the EPS. This redirection, however, is implemented by coupling additional plumbing to the BFP 100 and oftentimes requires at least the following items: 1) an EPS; 2) one or more pipe fittings; 3) copper pipe (that will have to be cut to size); 4) one or more elbow fittings; 5) one or more ball valves; 6) installation equipment including, for example, a wrench, a soldering iron and associated solder and flux, etc.; and 7) labor costs for the installation as it needs to be performed by a certified professional.

Accordingly, what is needed is a better system for monitoring the status of a BFP.

SUMMARY

In one aspect of the present disclosure there is a test cock for determining an operating condition of a backflow prevention system comprising: a body portion having a distal end and a proximal end; a space defined within the body portion; a distal opening provided on the body portion at the distal end; a proximal opening provided on the body portion at the proximal end, wherein the proximal opening is in fluid connection with body portion space; a body portion fitting disposed in the body portion, the body portion fitting providing a fluid connection with the body portion space; and a fluid sensor, coupled to the body portion fitting, in fluid connection with the body portion space.

The fluid sensor comprises at least one of: a pressure sensor; a temperature sensor; a pH sensor; a salinity sensor; and a wet/dry sensor.

The test cock can further comprise a ball valve disposed in the body portion in fluid connection with the distal opening and the body portion space. A spring clip can be provided that couples the fluid sensor to the body portion fitting.

The test cock can further comprise a system fitting, having a first end and a second end, the second end provided in the body portion proximal opening. A spring clip can couple the system fitting to the body portion proximal end. The body portion proximal end can be configured to rotate within the system fitting.

Another aspect of the present disclosure is a backflow prevention system comprising a backflow preventer; a system fitting, having a first end and a second end, provided on the backflow preventer; and the test cock referenced above.

BRIEF DESCRIPTION OF THE DRAWINGS

Various aspects of the disclosure are discussed herein with reference to the accompanying Figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, however, not every component may be labeled in every drawing. The Figures are provided for the purposes of illustration and explanation and are not intended as a definition of the limits of the disclosure. In the Figures.

DETAILED DESCRIPTION

Figure 1:
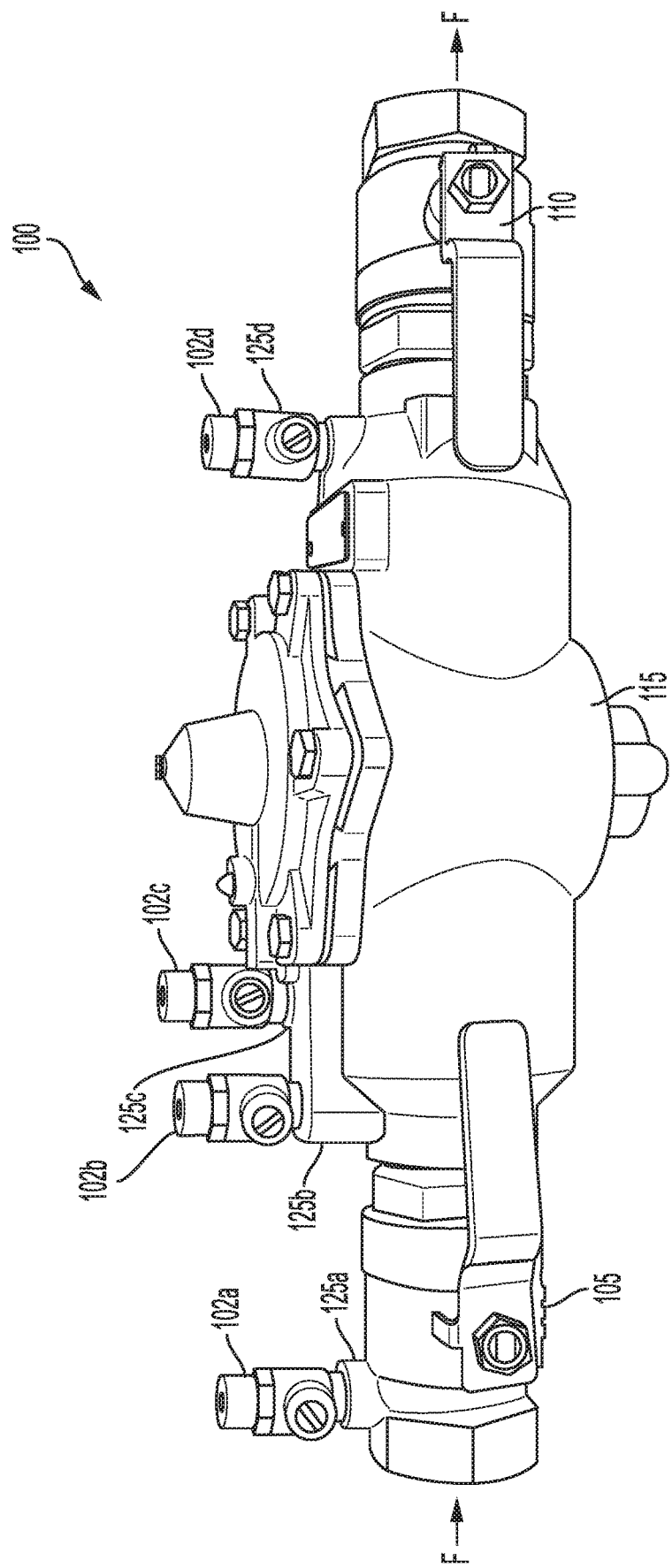
FIG. 1 is a known typical backflow preventer (BFP)

This application claims priority from U.S. Provisional Patent Application Ser. No. 62/844,912 entitled "Backflow Prevention System Test Cock With A Fluid Sensor," filed May 8, 2019, and from U.S. Provisional Patent Application Ser. No. 62/869,195 entitled "Wireless Communication System Within A Mechanical Room," filed Jul. 1, 2019, the entire contents of each of which is incorporated by reference in its entirety for all purposes.

The subject technology overcomes many of the known problems associated with backflow prevention assemblies. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the figures and not meant in a limiting manner.

Figure 2:
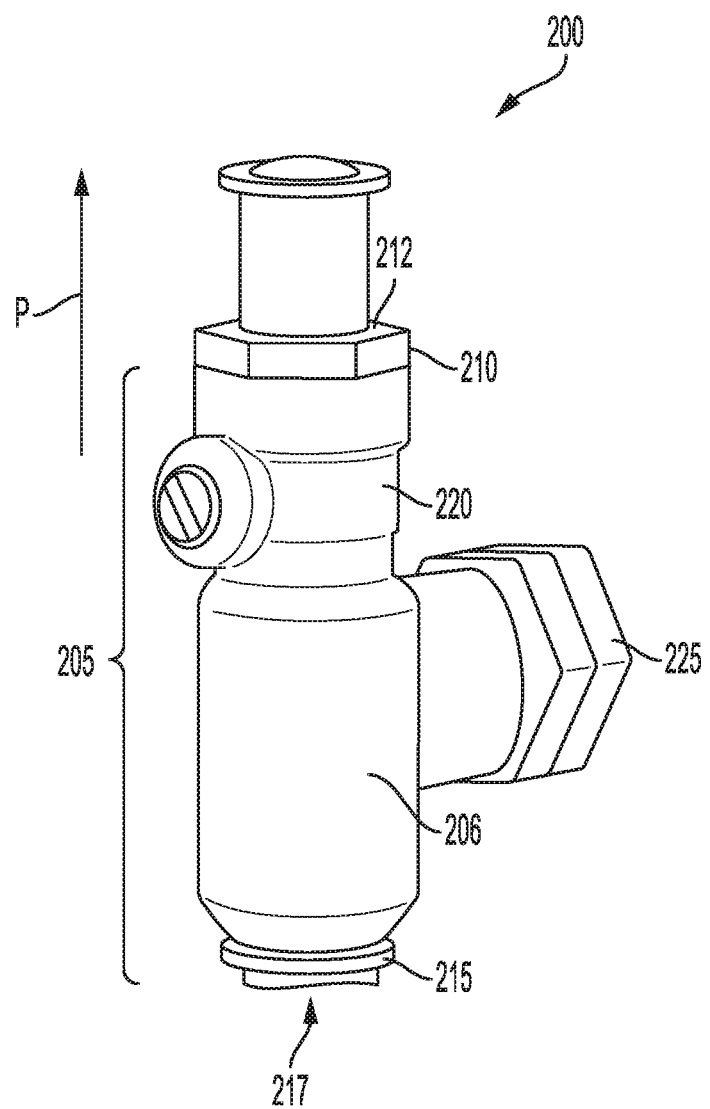
FIG. 2 is a test cock (TC) incorporating an Electronic Fluid Sensor (EFS device), in accordance with one aspect of the present disclosure.

A test cock (TC) 200, in accordance with one aspect of the present disclosure, as shown in FIG. 2, includes an elongated body portion 205, having a space 206 defined therein, with a distal end 210, a corresponding distal opening 212, a proximal end 215 and a corresponding proximal opening 217. As shown in FIG. 2, in one embodiment, each of the distal and proximal ends 210, 215 is generally cylindrical and each of the corresponding distal and proximal openings 212, 217 is generally circular. A ball valve 220 is located near the distal end 210 and a fitting 225 is provided on the body portion 205 between the distal end 210 and the proximal end 215. The distal opening 212, the proximal opening 217, the ball valve 220 and the fitting 225 are all in fluid connection with the body portion space 206. Fluid in the test cock 200 flows in a direction P, i.e., from the proximal end 215 to the distal end 210 under normal operation and, therefore, the fitting 225 is located "upstream" from the ball valve 210. It should be noted that the elongated body portion 205 would be configured to meet any local code requirements for minimum unobstructed flow.

Figure 3:
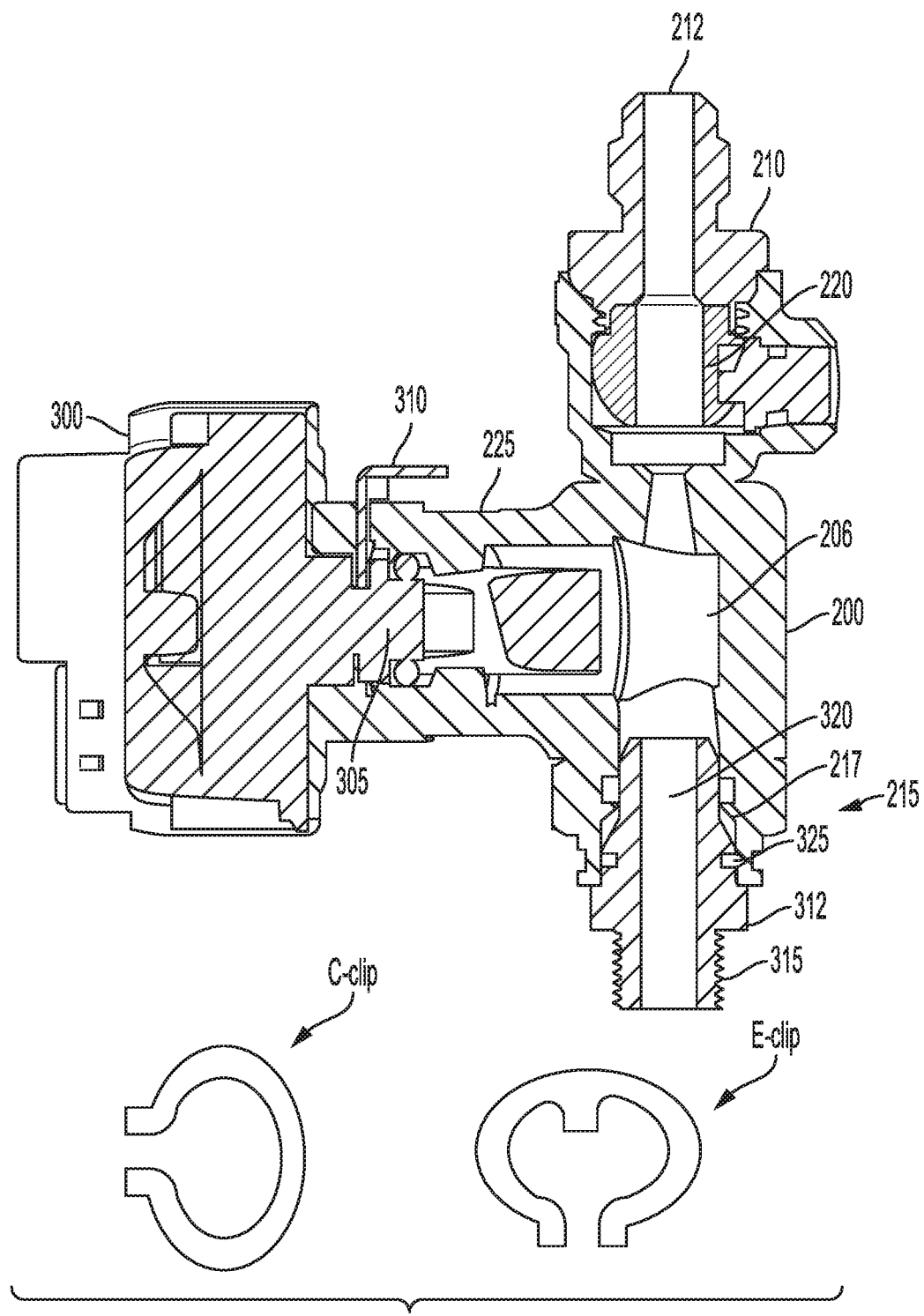
FIG. 3 is a side cutaway view of the test cock (TC) of FIG. 2.

Referring now to FIG. 3, the fitting 225 is provided to couple the test cock 200 to an Electronic Fluid Sensor (EFS) device 300 that can constantly monitor a parameter of a fluid in the system. In one aspect, the EFS device 300 can include a pressure sensor to measure the fluid pressure in the system. Alternatively, sensors to measure/monitor other parameters of the fluid can be provided, for example, but not limited to, temperature, pH, salinity, a wet/dry sensor (to determine the presence or absence of a fluid), etc. The fitting 225 can be configured to receive a portion 305 of the EFS device 300 and a flexible fastening clip 310 is provided to couple the portion 305 to the fitting 225 with a fluid-tight seal. The fastening clip 310 can be an e-clip or a c-clip or the like. Alternatively, the fitting 225 can be implemented as a key- or snap-fitting.

In one approach, in accordance with an aspect of the present disclosure, a BFP fitting 312, i.e., a system fitting, is used to secure the TC 200 to the body of a BFP 100. The BFP fitting 312 includes a threaded end 315 to attach to the BFP body and a non-threaded end 320 to be received in the proximal opening 320 of the TC 200. The non-threaded end 320 allows the TC 200 to rotate, i.e., there is no constraining orientation. Another flexible fastening clip 325 is provided to couple the BFP fitting 310 to the TC 200 with a fluid-tight seal. The fastening clip 325 can be an e-clip or a c-clip or the like. Alternatively, the fitting 225 can be implemented as a key- or snap-fitting.

The EFS device 300 can be powered by a long life battery that could be replaced at one of the code-required annual tests or when indicated. Alternatively, the EFS device 300 can be hardwired to a continuous power source, such as an in-wall power line, and/or provided with a battery backup feature in the event of a power outage. Still further, the EFS device 300 can be connected to a control/monitoring system in a number of ways including, but not limited to, Ethernet, RF or other wireless transmission mechanism, etc., where a low-power status could be reported and addressed.

Figure 4:
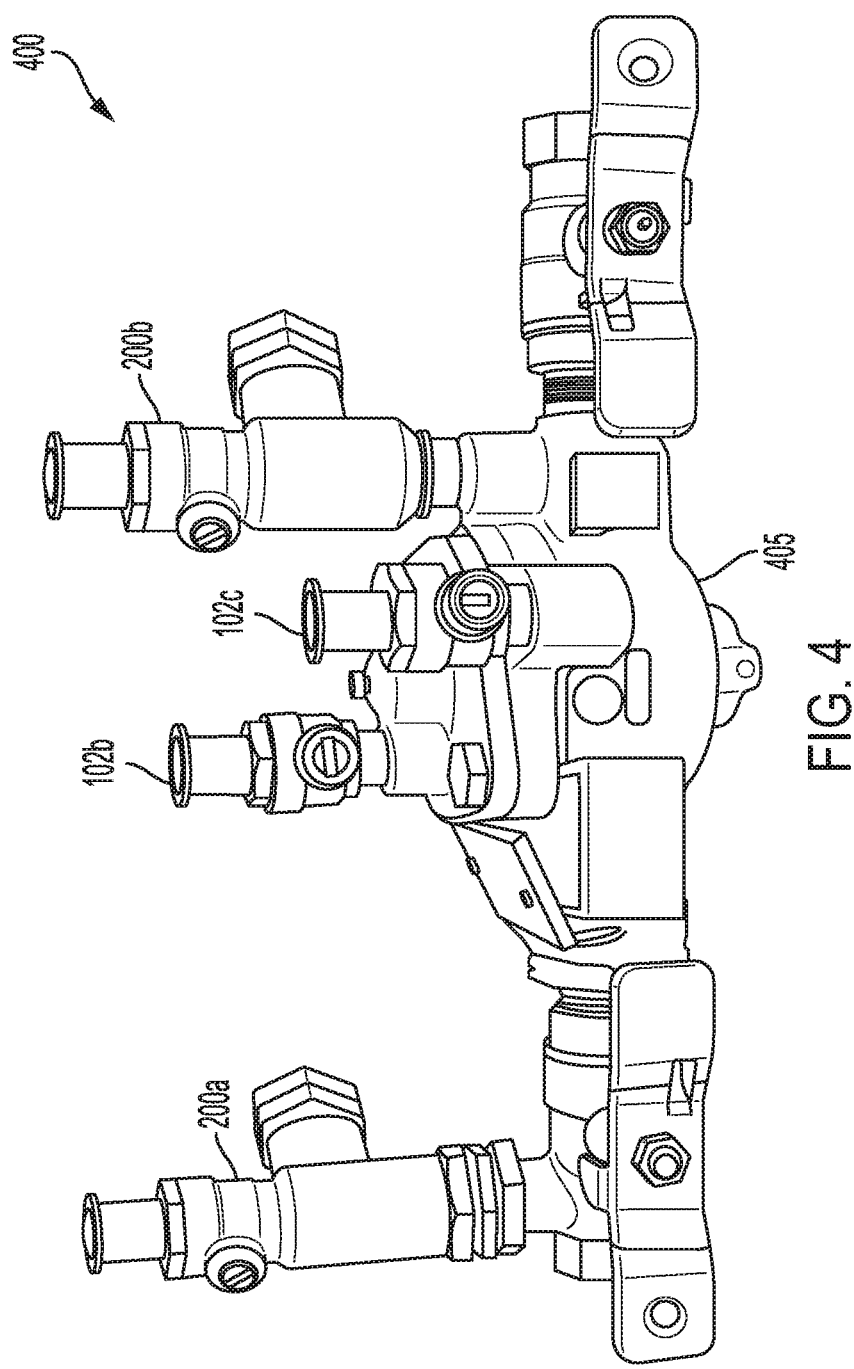
FIG. 4 is a backflow preventer including the TC of FIGS. 2 and 3.

A BFP system 400 is shown in FIG. 4 and includes a BFP 405 with two known TCs 102b, 102c installed along with two TCs 200a, 200b. It should be noted that the two TCs 200a, 200b are shown without a respective EFS device being connected for purposes of clarity. In some cases, at least three EFS devices would be deployed to determine that the BFP system 400 is functioning properly, i.e., in compliance with any relevant code(s) or requirement(s). Alternatively, in other cases, two EFS devices, or even a single EFS device, can be used.

Figure 5:
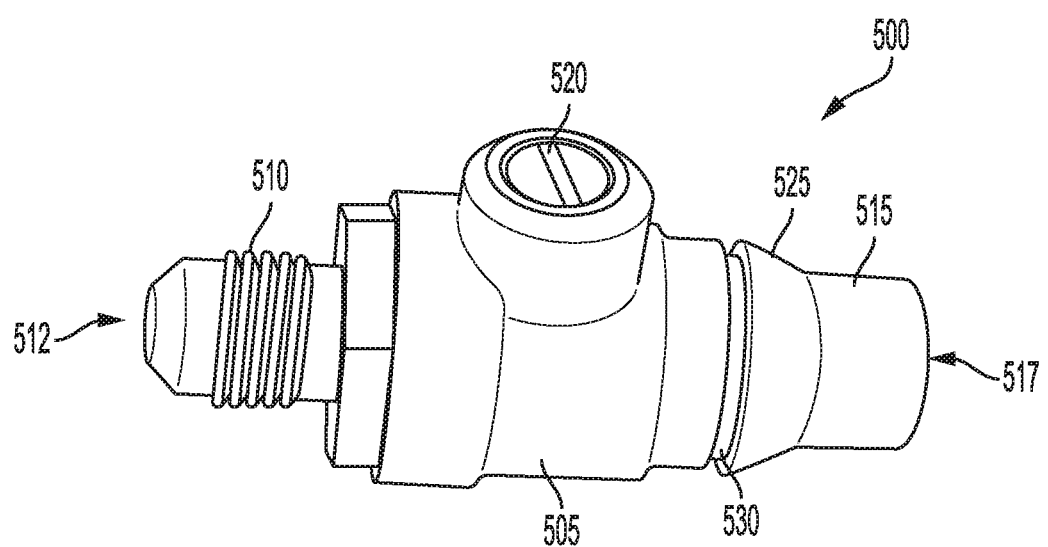
FIG. 5 is a test cock (TC) in accordance with another aspect of the present disclosure.

Referring now to FIG. 5, in accordance with another aspect of the present disclosure, a snap-in test cock (TC) 500 provides for the ability to swivel 360° along with a quick-disconnect feature, as will be described in more detail below. The snap-in TC 500 includes a body portion 505 having a threaded distal end 510, with a corresponding distal opening 512 and a non-threaded proximal end 515, with a corresponding proximal opening 517. As shown in FIG. 5, in one embodiment, each of the distal and proximal ends 510, 515 is generally cylindrical and each of the corresponding distal and proximal openings 512, 517 is generally circular. As per known TCs, a ball valve 520 is provided in the body portion 505. The ball valve 520, the proximal opening 517 and the distal opening 512 are all in fluid connection with a lumen provided in the snap-in TC 500.

A catch portion 525 of the body portion 505 has a larger outer diameter than the proximal end 515. A circumferential catch groove 530 is provided about the body 505 on the distal side of the catch portion 525 where the catch groove 530 has a smaller diameter than the diameter of the catch portion 525.

Figure 6:
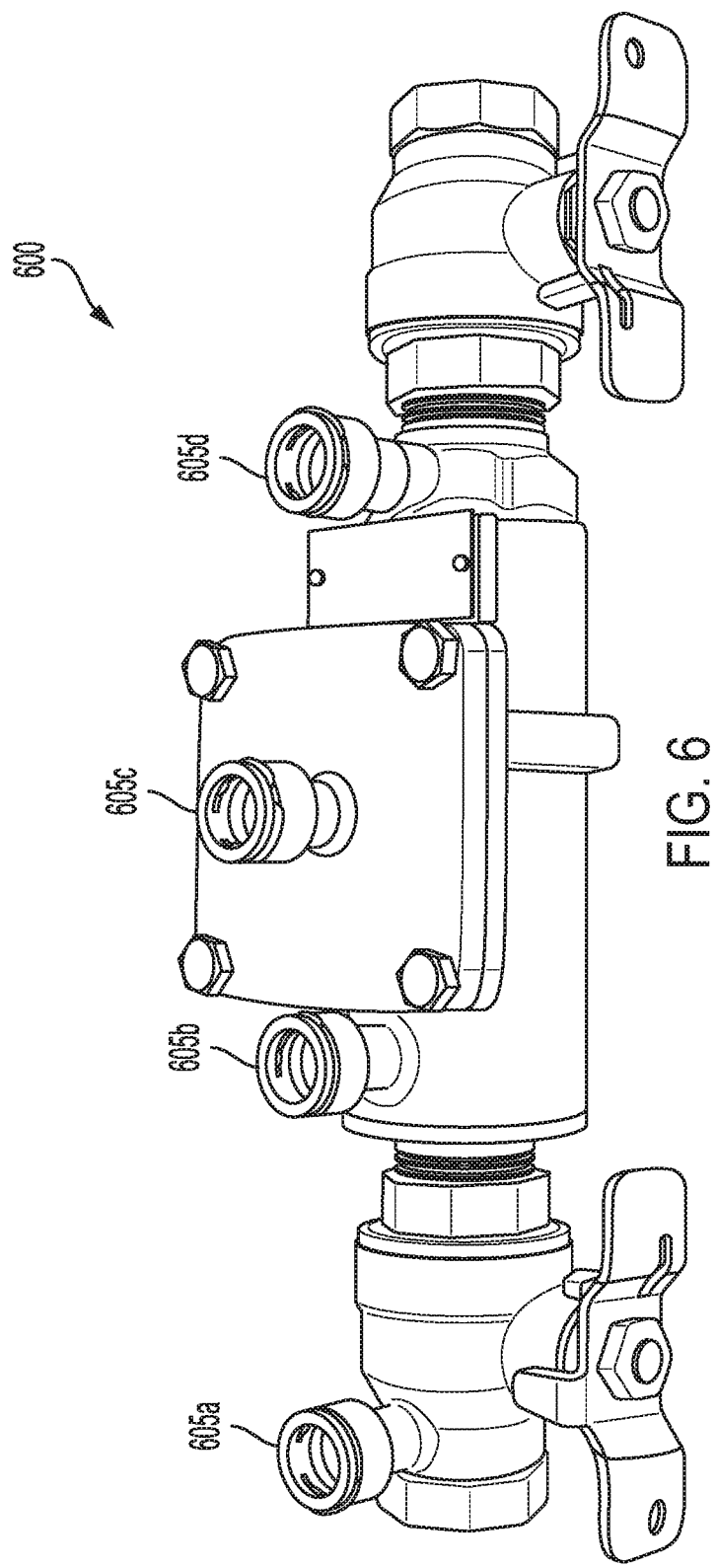
FIG. 6 is a BFP system configured to receive the TC of FIG. 5.

Referring now to FIG. 6, a backflow preventer (BFP) 600 is provided with a plurality of TC ports 605a-605d (generally 605) to couple with the snap-in TC 500, as will be described below. The TC ports 605 are arranged in a manner similar to the BFP 100 described above.

Figure 7:
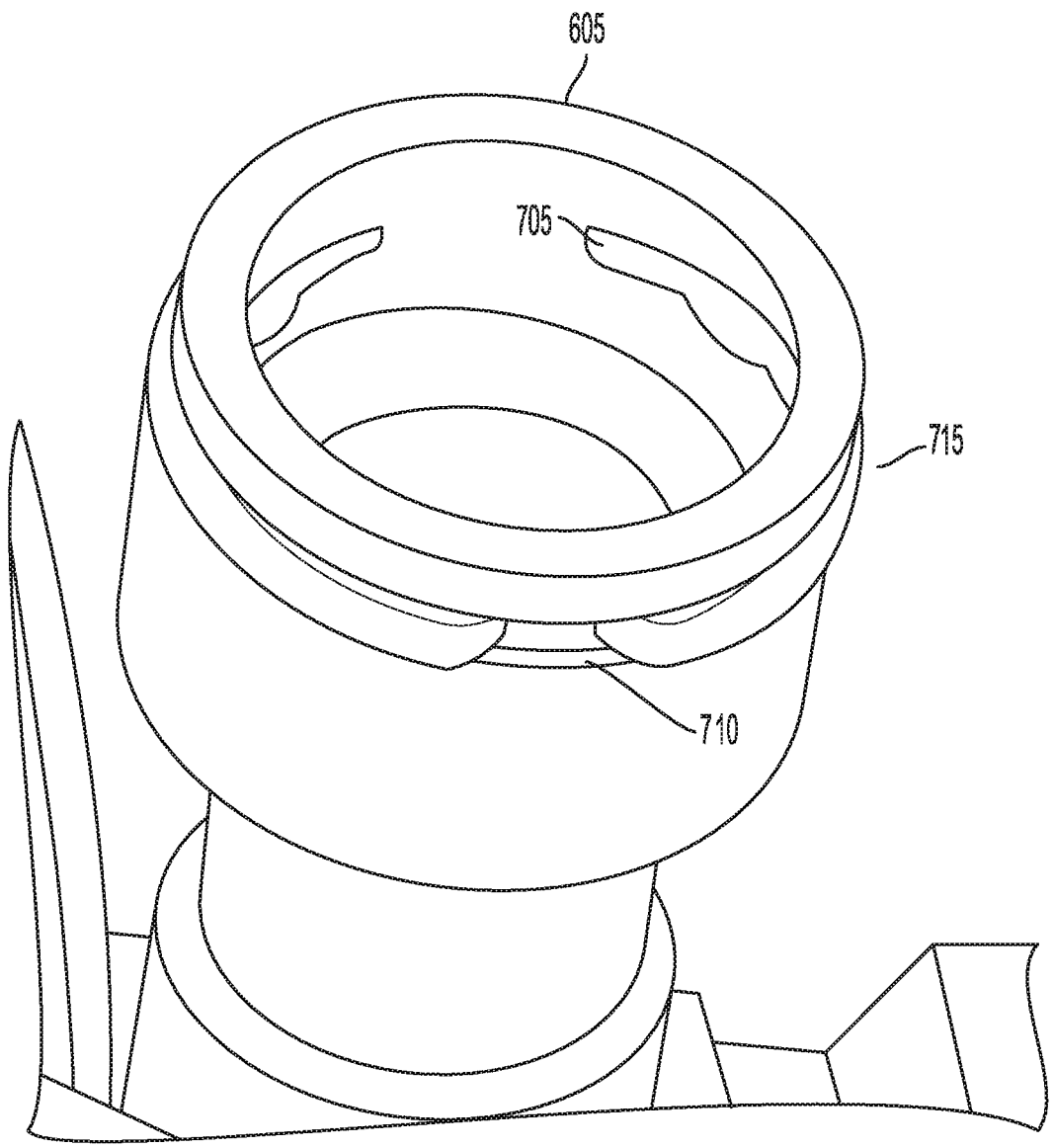
FIG. 7 is a close-up of a TC port of the BFP system of FIG. 6.
Figure 8A:
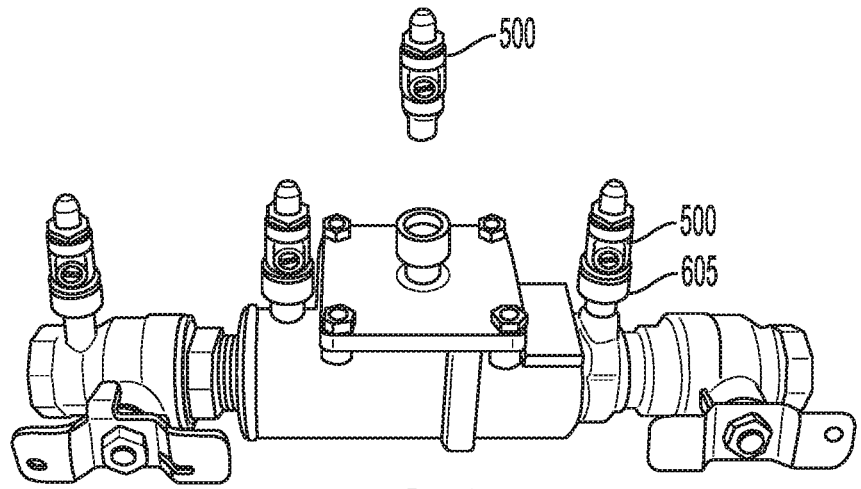
FIGS. 8A, 8B and 8C depict the insertion of a test cock of FIG. 5 into the TC port of FIG. 7.
Figure 8B:
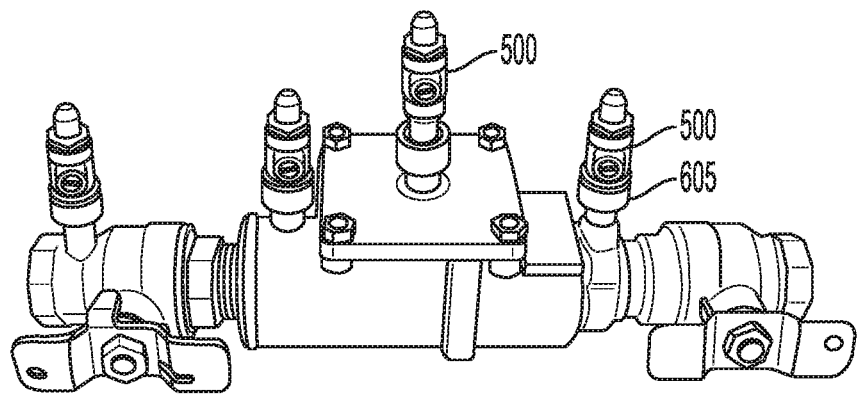
Figure 8C:
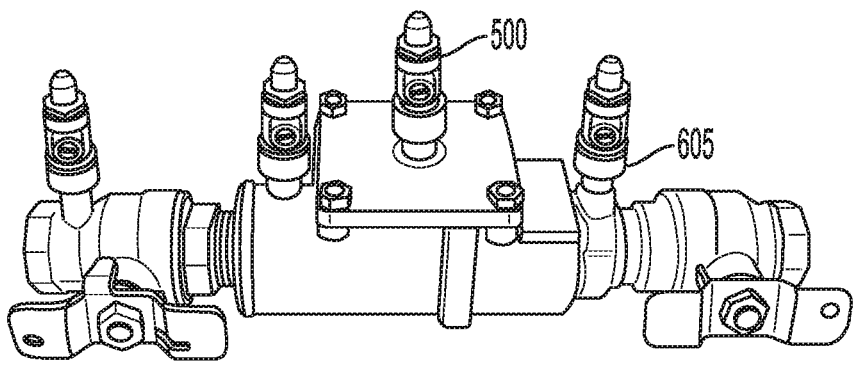

The TC port 605 may be screwed into the body of the BFP 600, as per known approaches. As shown in FIG. 7, a proximal end 705 of the TC port 605 is sized to receive the non-threaded proximal end 515 of the snap-in TC 500. A number of circumferential openings 710 are provided about the circumference of the TC port 605 and a flexible clip 715, for example, a c-clip, an e-clip or the like, is provided in the openings 710. A depth of the TC port 605 is such that, when the proximal end 515 of the snap-in TC 500 is inserted, the catch portion 525 will pass the clip 715, cause it to deform, and once the catch groove 530 is adjacent the clip 715, the clip 715 will spring back and the snap-in TC 500 will be captured, as shown in FIGS. 8A-8C. In order to remove the snap-in TC 500 from the TC portal 605, the clip 715 will have to be removed.

Alternatively, the TC port 605 may initially not have the clip 715 in place. Once the snap-in TC 500 is in position with the catch groove 530 aligned with the openings 710, the clip 715 can be inserted to couple the snap-in TC 500 to the TC port 605.

Figure 9:
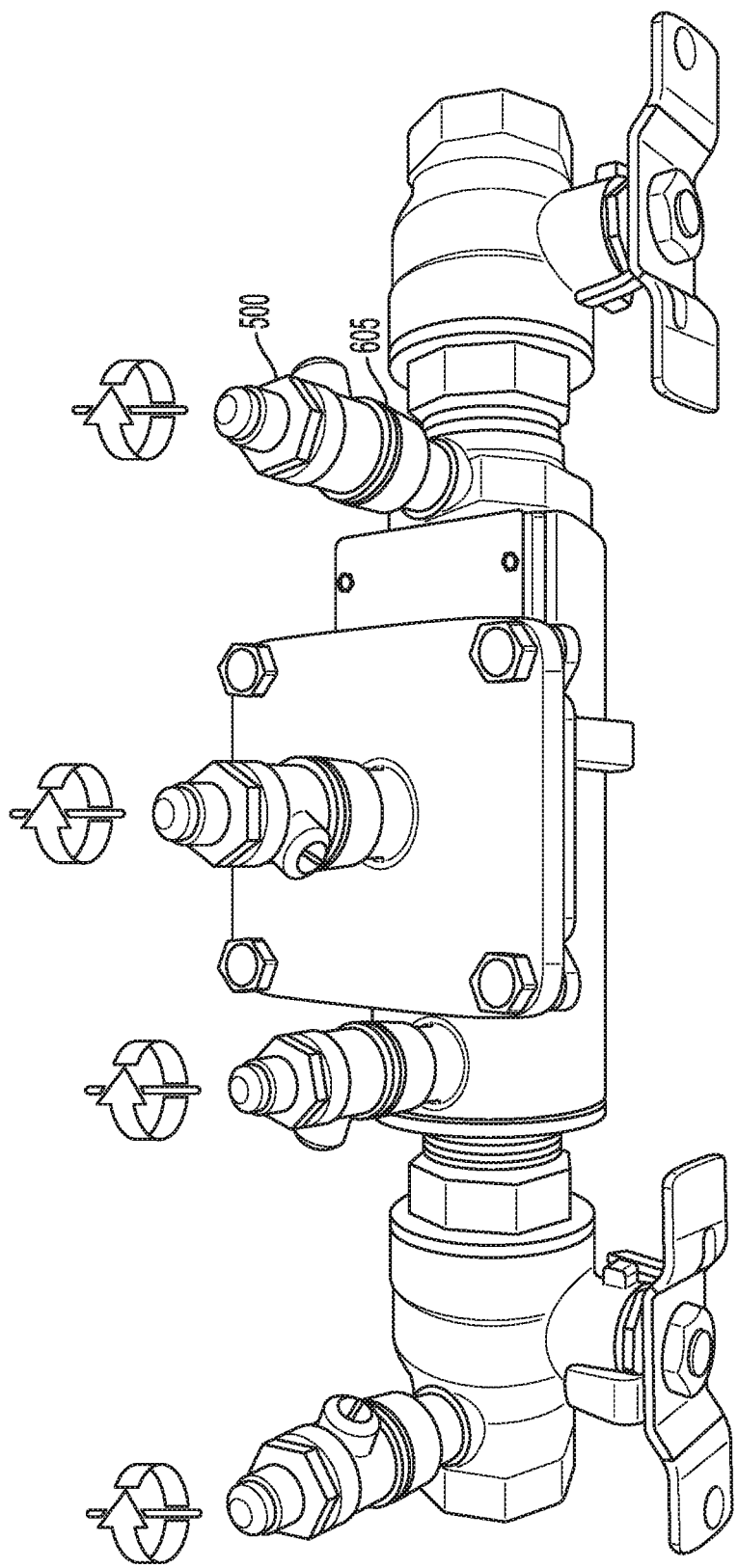
FIG. 9 shows the insertion of multiple TCs of FIG. 5 into a BFP system.

Advantageously, the snap-in TC 500 is then able to be rotated 360° as presented in FIG. 9.

In another aspect of the present disclosure, the proximal end 215 of the TC 200 can be configured as per the proximal end 515 of the snap-in TC 500. More specifically, instead of coupling to the BFP fitting 312, the proximal end 215 would include a catch portion and a circumferential catch groove as described above. Such a TC would then be inserted in a TC port 605 per the teachings set forth above.

The foregoing subject technology has a number of benefits over the known approaches, including, but not limited to: eliminating unnecessary valves, fittings and elbows as there is no need to redirect flow to a non-local EFS device; providing a TC assembly that can rotate 360° and, therefore, additional clearance is provided with a greater degree of freedom; permitting sensor installation in areas even if a full rotation is not possible, e.g., in areas where installing the sensor package with a conventional threaded connection would not be possible due to physical interference(s); and with an EFS device in each TC at multiple points on a BFP, the BFP can be continuously monitored in real-time to identify potential problems earlier without having to rely on finding an issue at the annual checkup.

Another aspect of the present disclosure presents technology that overcomes many of the known problems associated with wireless communication in mechanical rooms where BFPs are commonly located. Specifically, it is difficult to transmit and receive wireless signals from and to these mechanical rooms. Additionally, common modes of wireless communication, such as Wi-Fi and cellular data transmission, are power intensive modes that might require more power outlets than are commonly available is such rooms.

Figure 10:
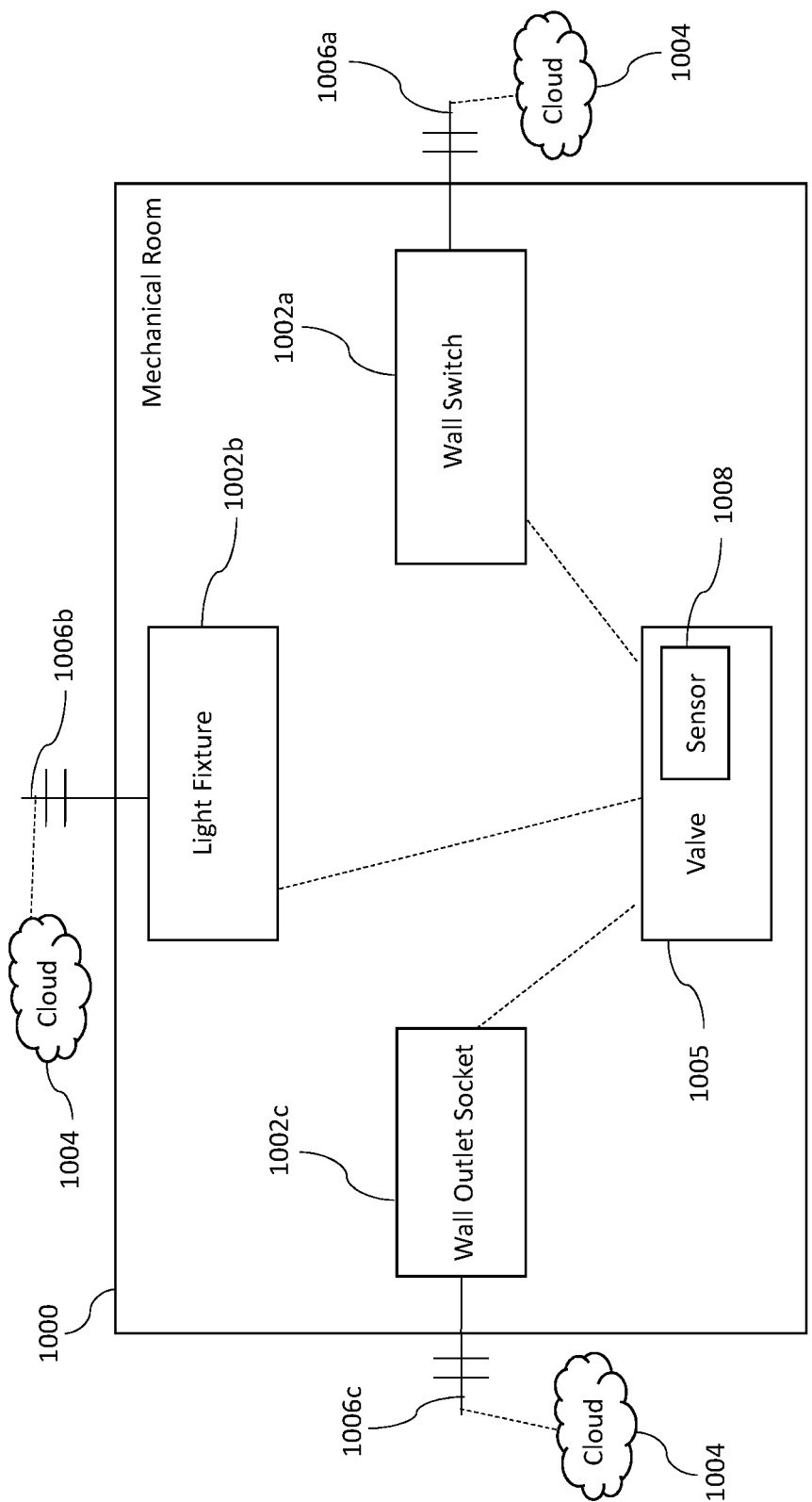
FIG. 10 is a block diagram of a wireless communication system within a mechanical room in accordance with the subject technology.

Referring now to FIG. 10, a block diagram of a mechanical room 1000 configured in accordance with the subject technology is shown. The mechanical room 1000 is an exemplary mechanical room that includes mechanical equipment for a building. In particular, the exemplary mechanical room 1000 includes a valve 1005 which controls some fluid flow through a building. Several devices 1002a-1002c (generally devices 1002) are also included in the mechanical room 1000, including a device configured to connect to or replace a wall light switch 1002a, a device connected to a light fixture 1002b, and a device configured to attach to a wall outlet socket 1002c. For a device configured to replace the light switch 1002a, the existing wall switch will be replaced by a communicating wall switch, such as a device including a transceiver for communication with other devices 1002, as discussed herein. This device 1002a would be connected to the in-wall power and continue to function as a normal light switch, controlling power to the same light as the original switch, but would include the additional communication capabilities. In this way, the existing light switch is adapted into a communicating light switch functioning as a device 1002 in accordance with the system described herein.

All devices 1002 are connected, via electrical lines 1006a-1006c, to their own in wall power source which powers the respective devices 1002, such as a main power supply for the building and/or the electrical grid. Notably, the devices 1002 within the mechanical room 1000 are exemplary only, and it should be understood that some or all devices 1002 may be omitted or replaced in different embodiments, or entirely different devices may be included, as could be found in typical mechanical rooms.

The valve 1005 can be part of a backflow preventer valve (BFP) system of the type discussed above and shown in FIGS. 1-9. The valve 1005 can further include a sensor 1008 of one of the various types used with BFP valves as discussed above. For example, the sensor 1008 can be a pressure sensor, temperature sensor, pH sensor, salinity sensor, and/or wet/dry sensor, or the like, which is configured to sense fluid properties within the valve 1005. In some cases, the valve 1005 can include multiple sensors each sensing different fluid properties. The mechanical room 1000 can also include multiple valves similar to the valve 1005, each with their own sensor or sensors.

The sensor 1008 is in wireless communication with at least one of the devices 1002 within the mechanical room 1000 over a network. The network can be formed through direct wireless communication between the devices 1002 and the sensor 1008, or by communication of all the devices 1002 and the sensor 1008 through a common transceiver or the like (not distinctly show). The devices 1002 and sensor 1008 are configured to wirelessly communicate over the network using low power signal communication modes such as Bluetooth or RF. As such, it should be understood that all devices 1002 and the sensor 1008 can include the necessary components for wireless communication as are known in the art, such as receivers/transmitters, processors, and the like. In every case, the valve 1005 and/or sensor 1008 will include at least a transmitter for sending out data gathered by the sensor 1008 and at least one of the devices 1002 will include a receiver for receiving the data from the sensor 1008. In some cases, the valve 1005 contains a signal processor built into the sensor 1008 to analyze the data before transmitting a signal representative of that data.

Since the devices 1002 and sensor 1008 are all relatively local to each other within the mechanical room 1000, and transmission out of the mechanical room 1000 is not required for communication between the devices 1002 and sensor 1008, low power signal communication still allows for effective communication between the devices 1002 and sensor 1008 with lower bandwidth usage and power consumption. Each sensor 1008 on the system can be powered by a standard, replaceable battery. Since power consumption is low, the batteries need to be replaced infrequently and no wires are required to be run from the sensor 1008 to other power sources.

Eventually, the data from the sensor 1008 reaches one of the devices 1002. Typically, transmission out of the mechanical room 1000 can be difficult, and often is not possible using low power communication techniques. In accordance with the subject technology, there are several ways to then communicate the data out of the mechanical room 1000, to an external location where it can be processed and/or otherwise used. One way to do so is by using known power-line communication (PLC) techniques over one or more of the electrical lines 1006. PLC techniques essentially allow a power line to function secondarily as an Ethernet cable, eliminating the need to run an additional wire since the device 1002, and by association the sensor 1008, can effectively transmit data out of the mechanical room 1000 using the existing power lines 1006. In some cases, the data can be communicated over the existing power lines 1006 to a central cloud 1004 where it is stored.

Figure 11:
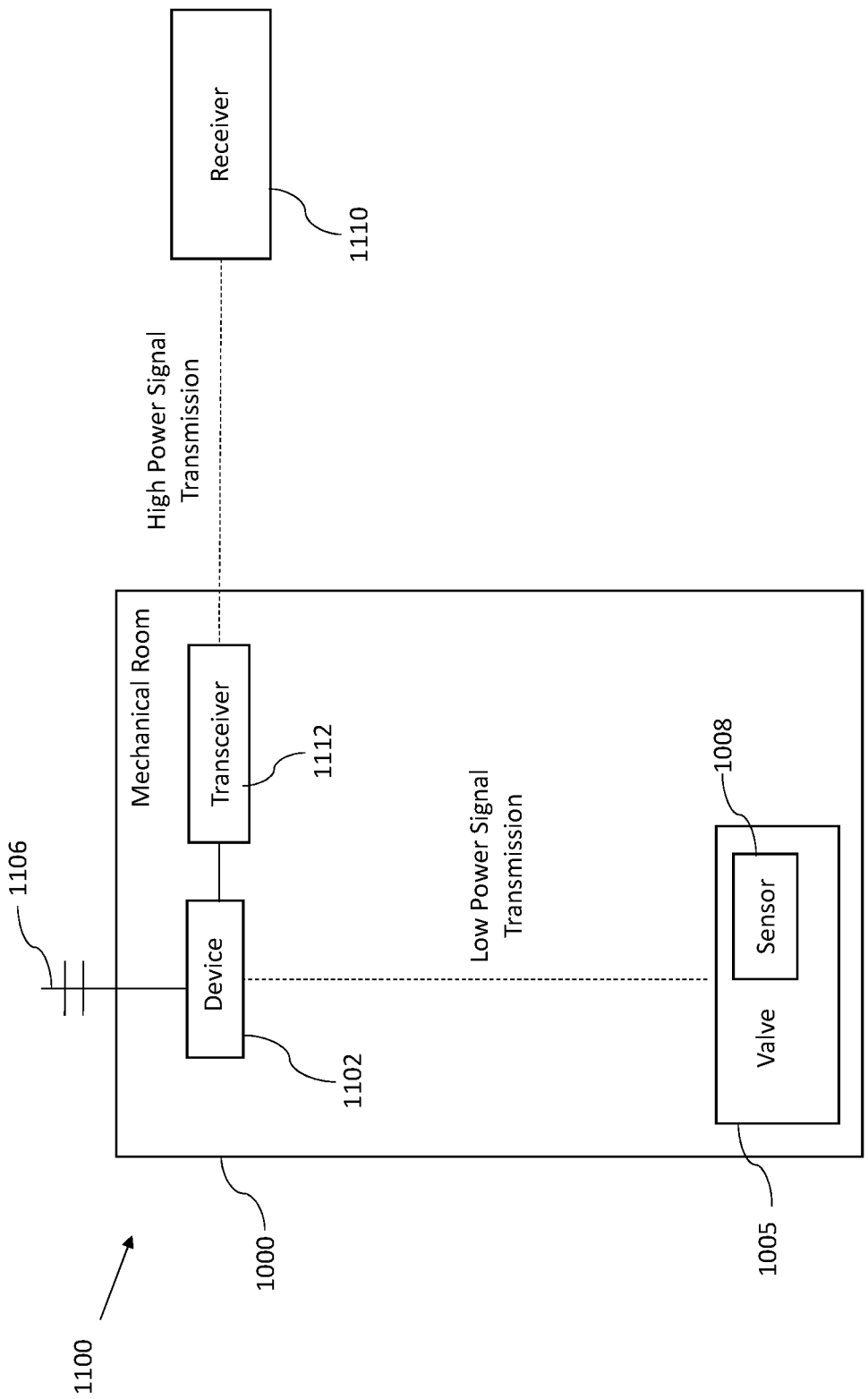
FIG. 11 is a block diagram of a wireless communication system within and out of a mechanical room in accordance with the subject technology.

Referring now to FIG. 11, a block diagram of a wireless communication system 1100 for a mechanical room in accordance with the subject technology is shown. The system 1100 includes a mechanical room 1000 which includes a valve 1005 and sensor 1008 communicating with a single device 1102. The device 1102 is hooked up to an electrical line 1106 which is connected to an in-wall power source. Similar to the devices 1002, the device 1102 can be any type of device typically found in a mechanical room and electrically connected to an in-wall power source. The sensor 1008 and the device 1102 communicate over a network using lower power signal communication. In particular, the sensor 1008 measures properties at the valve 1005 and transmits data related to those measurements to the device 1102 which receives that data. In this way, transmission of the data from the sensor 1008 requires little power, allowing the sensor 1008 to be effectively powered by a battery.

The device 1102 is also directly connected to a transceiver 1112. The transceiver 1112 can be a separate device connected to the device 1102 through a wired connection, or can be integrated as a part of the device 1102. The transceiver 1112 is generally configured to transmit data out the mechanical room using high power signal transmission (e.g. higher power than Bluetooth or the like) for receipt by an external receiver 1110. As such, the transceiver 1112 is configured to receive the signal from the sensor 1008 through the network using low power communication, amplify the signal to create a high power signal, and transmit the high power signal out of the mechanical room 1000 to the external receiver 1110. The transceiver 1112 can therefore include component parts configured to accomplish these tasks, including a receiver, an amplifier, a transmitter, and a processor and/or memory as needed.

Since the transceiver 1112 is directly connected to the device 1102 (i.e. locally and/or through a wired connection), the transceiver 1112 is also connected to the in wall power source via the electrical line 1106. Therefore the transceiver 1112 does not need to rely on a battery, and is able to transmit a high power signal indicative of data from the valve out of the mechanical room 1110 even though the electronics on the valve 1005 are only powered by a battery and transmitting a low powered signal. The transceiver 1112 can also be configured to receive signals from multiple different valves within the mechanical room 1000. To that end, many valves can be included in the mechanical room which provide data to the transceiver 1112 over a network using lower power signal transmission, and the transceiver 1112 can be tasked with transmitting all of this data out of the mechanical room 1000 via a high power signal. As such, the bulk of the power consumption needed to communicate data from the mechanical room 1000 is handled by the transceiver 1112 which is connected to a reliable and continuous in-wall power source.

In one aspect of the present disclosure there is a wireless communication system located within a mechanical room, the wireless communication system comprising: a valve including at least one sensor, wherein the at least the one sensor is configured to wirelessly communicate over a network using low power signal communication; and at least one device configured to connect to an in-wall power source, the device further configured to wirelessly communicate over the network using low power signal communication.

At least one device is configured to connect to a light fixture, the first device connected to the in-wall power source via the light fixture.

A first device of the at least one devices can be configured to connect to a wall outlet socket, the first device connected to the in-wall power source via the wall outlet socket.

A first device of the at least one devices can be configured to replace a first light switch controlling a light, the first device connected to the in-wall power source and including a second light switch to control the light.

It will be appreciated by those of ordinary skill in the pertinent art that the functions of several elements may, in alternative embodiments, be carried out by fewer elements, or by a single element. Similarly, in some other alternate embodiments, any functional element may perform fewer, or different, operations than those described with respect to the illustrated embodiment. Also, functional elements (e.g., check valves, shut-off valves, and the like) shown as distinct for purposes of illustration may be incorporated within other functional elements in a particular implementation.

While the subject technology has been described with respect to various embodiments, those skilled in the art will readily appreciate that various changes and/or modifications can be made to the subject technology without departing from the scope of the present disclosure.

What is claimed is:

1. A backflow prevention assembly comprising:
   a backflow prevention housing defining a test cock port; and
   a test cock assembly extending along a first axis for determining an operating condition of the backflow prevention assembly, the test cock assembly having: an inlet end connector configured to sealingly engage the test cock port for ingress of fluid; an outlet end connector configured to selectively sealingly engage a gauge assembly for egress of the fluid; and a body extending between the inlet end connector and the outlet end connector to create a linear flowpath along the first axis from the inlet end connector to the outlet end connector, wherein the inlet end connector swivels 360° about the first axis when coupled to the back flow prevention system connector and the both houses a ball valve to selectively open and close the linear flowpath.

2. A backflow prevention assembly as recited in claim 1, wherein the test cock includes a fitting for a sensor extending along a second axis, the second axis being substantially perpendicular to the first axis and the fitting in fluid communication with the linear flowpath.

3. A backflow prevention assembly ax recited in claim 2, further comprising a sensor coupled to the fitting for continuously monitoring the operating condition.

4. A backflow prevention assembly as recited in claim 1, wherein the test cock port and inlet end connector are configured to be joined by moving the inlet end connector along the first axis into the test cock port.

5. A backflow prevention assembly as recited in claim 1, wherein the test cock port is defined by a tube terminating in a collar and the tube extends along the first axis.

6. A backflow prevention assembly as recited in claim 5, wherein:
the inlet end connector has a catch portion defining an annular groove; and
the test cock port defines at least one circumferential opening,
and further comprising a spring clip configured to extend partially into the at least one circumferential opening and the annular groove to retain the test cock assembly in the test cock port.

7. A backflow prevention assembly as recited in claim 6, wherein the inlet end connector, the test cock port and the spring clip are generally circular and concentric with the first axis so that the flowpath passes through the spring clip.

8. A backflow prevention assembly as recited in claim 6, wherein catch portion has an angled proximal surface and the spring clip is secured in the at least one circumferential opening so that upon insertion of the test cock assembly into the test cock port, the angled proximal surface deforms the spring clip radially outward until the spring clip snaps into the annular groove to provide audible and haptic feedback to a user that the test cock assembly is securely attached to the test cock port.

9. A backflow prevention assembly as recited in claim 6, wherein the spring clip is removed to release the test cock assembly from the test cock port.

10. A backflow prevention assembly comprising:
a backflow prevention housing defining a test cock port;
a test cock assembly extending along a first axis for determining an operating condition of the backflow prevention assembly, the test cock assembly having: an inlet end connector configured to sealingly engage the test cock port, wherein the inlet end connector swivels 360° about the first axis when coupled to the backflow prevention system connector: a fitting connector for a sensor extending along a second axis, the second axis being substantially perpendicular to the first axis and the fitting connector being in fluid communication with the inlet end connector; an outlet end connector in fluid communication with the inlet end connector, the outlet end connector configured to selectively connect to a test fixture; and a ball valve assembly having an adjustment feature to selectively close fluid communication between the outlet end connector and the inlet end connector,
wherein the test cock port and inlet end connector are configured to be joined by moving the inlet end connector along the first axis into the test cock port so that the fitting connector and adjustment feature can be oriented to avoid mechanical interference; and
a sensor coupled to the fitting connector for continuously monitoring the operating condition.

11. A test cock assembly for determining an operating condition of a backflow prevention system, the test cock assembly comprising:
a body portion defining an interior, the body portion having a proximal inlet end connector, a distal outlet end connector, and a fitting connector intermediate the proximal inlet end connector and the distal outlet end connector, wherein each connector is in fluid communication with the interior; and
a backflow prevention system connector extending along a first axis for sealingly engaging the proximal inlet end connector, wherein the proximal inlet end connector freely rotates about the first axis when coupled to the backflow prevention system connector to selectively orient the fitting connector.

12. The test cock assembly of claim 11, wherein the proximal inlet end connector receives the backflow prevention system connector therein.

13. The test cock assembly of claim 11, wherein the backflow prevention system connector receives the proximal inlet end connector therein.

14. The test cock assembly of claim 13, wherein fixing the backflow prevention system connector and the proximal inlet end connector together occurs by the proximal inlet end connector canning against a flexible clip located within the backflow prevention system connector, the flexible clip snapping around a catch groove of the proximal inlet end connector.

15. The test cock assembly of claim 11, further comprising a fluid sensor fitting defined by the body portion.

16. The test cock assembly of claim 15, further comprising a fluid sensor, wherein the fluid sensor fitting sealingly engages the fluid sensor, the fluid sensor fitting enabling free rotation of the fluid sensor therein.

17. The test cock assembly of claim 11, further comprising a ball valve adjacent the distal outlet end connector, wherein the proximal inlet end connector freely rotates about the first axis to selectively orient the hall valve.

* * * * *